(12) United States Patent
Yang et al.

(10) Patent No.: US 10,805,890 B2
(45) Date of Patent: Oct. 13, 2020

(54) SYNCHRONIZATION SIGNAL SENDING METHOD AND APPARATUS

(71) Applicant: HUAWEI TECHNOLOGIES CO., LTD., Shenzhen, Guangdong (CN)

(72) Inventors: Kun Yang, Beijing (CN); Ronghui Wen, Beijing (CN); Guangwei Yu, Beijing (CN); Wurong Zhang, Beijing (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/444,859

(22) Filed: Jun. 18, 2019

(65) Prior Publication Data

US 2019/0306818 A1    Oct. 3, 2019

Related U.S. Application Data

(63) Continuation of application No. PCT/CN2017/115330, filed on Dec. 8, 2017.

(30) Foreign Application Priority Data

Dec. 19, 2016  (CN) .......................... 2016 1 1174894

(51) Int. Cl.
*H04W 56/00*    (2009.01)
*H04L 27/26*    (2006.01)

(52) U.S. Cl.
CPC ......... *H04W 56/0005* (2013.01); *H04L 27/26* (2013.01); *H04L 27/2655* (2013.01); *H04W 56/00* (2013.01)

(58) Field of Classification Search
CPC ............. H04W 56/0005; H04W 56/00; H04W 56/001; H04W 56/0015; H04W 56/002;

(Continued)

(56) References Cited

U.S. PATENT DOCUMENTS

2007/0183306 A1    8/2007  Akita et al.
2007/0183391 A1    8/2007  Akita et al.
(Continued)

FOREIGN PATENT DOCUMENTS

CN    101001476 A    7/2007
CN    101238666 A    8/2008
(Continued)

OTHER PUBLICATIONS

Ericsson LM et al. Narrowband LTE—Concept Description, 3GPP TSG RAN WG1 Meeting #82, R1-154659, Beijing, China, Aug. 24-28, 2015, total 9 pages.

*Primary Examiner* — Ian N Moore
*Assistant Examiner* — Brian T Le
(74) *Attorney, Agent, or Firm* — Womble Bond Dickinson (US) LLP

(57) ABSTRACT

Embodiments of this application provide a synchronization signal sending method and apparatus. The method includes: obtaining an initial synchronization sequence, where a spectrum width corresponding to the initial synchronization sequence is greater than a bandwidth of a synchronization channel and is less than a sum of the bandwidth of the synchronization channel and a system protection bandwidth; dividing the initial synchronization sequence into N sub-synchronization sequences; carrying the N sub-synchronization sequences on N time-domain symbols; and sending the N time-domain symbols to a receiving apparatus. According to the synchronization signal sending method provided in the embodiments of this application, a bandwidth loss of a synchronization signal is reduced, and utilization and synchronization performance of a system synchronization bandwidth are improved.

15 Claims, 5 Drawing Sheets

(58) Field of Classification Search
CPC ........... H04W 56/0025; H04W 56/003; H04W
56/0035; H04W 56/004; H04W 56/0045;
H04W 56/005; H04W 56/0055; H04W
56/006; H04W 56/0065; H04W 56/007;
H04W 56/0075; H04W 56/008; H04W
56/0085; H04W 56/009; H04W 56/0095;
H04L 27/26; H04L 27/2655; H04L
27/2656; H04L 27/2657; H04L 27/2659;
H04L 27/266; H04L 27/2662; H04L
27/2663; H04L 27/2665; H04L 27/2666
See application file for complete search history.

(56) References Cited

U.S. PATENT DOCUMENTS

| | | |
|---|---|---|
| 2009/0147757 A1 | 6/2009 | Naka et al. |
| 2010/0080311 A1 | 4/2010 | Moffatt et al. |
| 2011/0149946 A1 | 6/2011 | Gresset |
| 2014/0198772 A1 | 7/2014 | Baldemair et al. |
| 2014/0213253 A1 | 7/2014 | Koskinen et al. |
| 2019/0013985 A1 | 1/2019 | Takeda et al. |

FOREIGN PATENT DOCUMENTS

| | | |
|---|---|---|
| CN | 102098266 A | 6/2011 |
| CN | 102149188 A | 8/2011 |
| CN | 102695226 A | 9/2012 |
| CN | 103078825 A | 5/2013 |
| CN | 103718615 A | 4/2014 |
| CN | 107925975 A | 4/2018 |
| EP | 3340700 A1 | 6/2018 |
| WO | 2008/131462 A1 | 10/2008 |
| WO | 2016112754 A1 | 7/2016 |

SYNCHRONIZATION SIGNAL SENDING METHOD AND APPARATUS

CROSS-REFERENCE TO RELATED APPLICATIONS

This application is a continuation of International Application No. PCT/CN2017/115330, filed on Dec. 8, 2017, which claims priority to Chinese Patent Application No. 201611174894.1, filed on Dec. 19, 2016. The disclosures of the aforementioned applications are hereby incorporated by reference in their entireties.

TECHNICAL FIELD

Embodiments of this application relate to the field of communications technologies, and in particular, to a synchronization signal sending method and apparatus.

BACKGROUND

A synchronization technology is one of key technologies of a wireless communications system. A transmit end inserts specific synchronization information into a signal that is sent, and a receive end obtains the synchronization information in the received signal by using a synchronization algorithm, so that the receive end is synchronized with the transmit end.

A narrowband communications system is an important branch of the wireless communications system. The narrowband communications system is a communications system whose bandwidth is limited. A quantity of frequency-domain subcarriers that are included in a time-domain symbol is limited. To obtain relatively good synchronization performance, the transmit end usually combines a plurality of time-domain symbols that are continuously sent, to transfer the synchronization information. A plurality of symbols can carry a relatively long synchronization sequence in the frequency domain, thereby improving an autocorrelation characteristic of the synchronization sequence.

Currently, when the narrowband communications system generates a synchronization sequence, a spectrum width corresponding to the synchronization sequence does not exceed a bandwidth of a synchronization channel of the system. However, a structure of the time-domain symbol usually includes redundancy. For example, an orthogonal frequency division multiplexing (OFDM) symbol includes a cyclic prefix (CP), or the transmit end needs to add redundancy information to the time-domain symbol, or a bandwidth of a synchronization signal is limited in the frequency domain. After operations such as redundancy elimination and bandwidth limitation are performed on the synchronization signal, a bandwidth loss of the synchronization signal is caused, correlation characteristics of the synchronization signal deteriorate, and synchronization performance is impaired.

SUMMARY

Embodiments provide a synchronization signal sending method and apparatus, to reduce a bandwidth loss of a synchronization signal and improve utilization and synchronization performance of a system synchronization bandwidth.

According to a first aspect, an embodiment provides a synchronization signal sending method. The method includes: obtaining an initial synchronization sequence; dividing the initial synchronization sequence into N sub-synchronization sequences; carrying the N sub-synchronization sequences on N time-domain symbols, where each sub-synchronization sequence is carried in one time-domain symbol; and sending the N time-domain symbols to a receiving apparatus.

In one embodiment, a system synchronization bandwidth and a system protection bandwidth are fully used, so that a length of the initial synchronization sequence is increased and a correlation is better. After operations such as redundancy elimination and bandwidth limitation are performed, a bandwidth loss of the synchronization signal can be reduced, and utilization and synchronization performance of the system synchronization bandwidth are improved.

In one embodiment, a length L of the initial synchronization sequence satisfies:

$$(BW_{sync}+M \cdot BW_{subcarrier}) \cdot T_{sync} > L > BW_{sync} \cdot T_{sync},$$

where $BW_{sync}$ is a bandwidth of a synchronization channel, $BW_{subcarrier}$ is a subcarrier bandwidth, $T_{sync}$ is duration of the synchronization signal, $M = BW_{protect}/BW_{subcarrier}$, and $BW_{protect}$ is the system protection bandwidth.

In one embodiment, a value range of the length of the initial synchronization sequence is specifically provided. By selecting the initial synchronization sequence in the length range, the system synchronization bandwidth and the system protection bandwidth can be fully used, the bandwidth loss of the synchronization signal can be reduced, and the utilization and the synchronization performance of the system synchronization bandwidth can be improved.

In one embodiment, a length L of the initial synchronization sequence satisfies:

$$\left(\frac{BW_{sync}}{BW_{subcarrier}} + M\right) \cdot N > L > \frac{BW_{sync}}{BW_{subcarrier}} \cdot N.$$

In one embodiment, another value range of the length of the initial synchronization sequence is specifically provided. By selecting the initial synchronization sequence in the length range, the system synchronization bandwidth and the system protection bandwidth can be fully used, the bandwidth loss of the synchronization signal can be reduced, and the utilization and the synchronization performance of the system synchronization bandwidth can be improved.

In one embodiment, a maximum value of M is 2.

In one embodiment, before dividing the initial synchronization sequence into N sub-synchronization sequences, the method may further include: performing upsampling on the initial synchronization sequence.

According to a second aspect, a synchronization signal sending apparatus is provided. The synchronization signal sending apparatus varies with different communications systems. For example, the synchronization signal sending apparatus may be an evolved base station, a base station, a micro base station, a wireless router, or a terrestrial station. The apparatus includes a processing module and a transceiver module. The processing module is configured to: obtain an initial synchronization sequence; divide the initial synchronization sequence into N sub-synchronization sequences; and carry the N sub-synchronization sequences on N time-domain symbols, where each sub-synchronization sequence is carried in one time-domain symbol. The transceiver module is configured to send the N time-domain symbols to a receiving apparatus.

In one embodiment, a length L of the initial synchronization sequence satisfies:

$$(BW_{sync}+M\cdot BW_{subcarrier})\cdot T_{sync} > L > BW_{sync}\cdot T_{sync},$$

where $BW_{sync}$ is a bandwidth of a synchronization channel, $BW_{subcarrier}$ is a subcarrier bandwidth, $T_{sync}$ is duration of a synchronization signal, $M=BW_{protect}/BW_{subcarrier}$, and $BW_{protect}$ is a system protection bandwidth.

In one embodiment, a length L of the initial synchronization sequence satisfies:

$$\left(\frac{BW_{sync}}{BW_{subcarrier}}+M\right)\cdot N > L > \frac{BW_{sync}}{BW_{subcarrier}}\cdot N.$$

In one embodiment, a maximum value of M is 2.

In one embodiment, the processing module is further configured to perform upsampling on the initial synchronization sequence.

According to a third aspect, another synchronization signal sending apparatus is provided. The synchronization signal sending apparatus varies with different communications systems. For example, the synchronization signal sending apparatus may be an evolved base station, a base station, a micro base station, a wireless router, or a terrestrial station. The apparatus includes a processor and a transceiver. The processor is configured to: obtain an initial synchronization sequence; divide the initial synchronization sequence into N sub-synchronization sequences; and carry the N sub-synchronization sequences on N time-domain symbols, where each sub-synchronization sequence is carried in one time-domain symbol. The transceiver is configured to send the N time-domain symbols to a receiving apparatus.

In one embodiment, a length L of the initial synchronization sequence satisfies:

$$(BW_{sync}+M\cdot BW_{subcarrier})\cdot T_{sync} > L > BW_{sync}\cdot T_{sync},$$

where $BW_{sync}$ is a bandwidth of a synchronization channel, $BW_{subcarrier}$ is a subcarrier bandwidth, $T_{sync}$ is duration of a synchronization signal, $M=BW_{protect}/BW_{subcarrier}$, and $BW_{protect}$ is a system protection bandwidth.

In one embodiment, a length L of the initial synchronization sequence satisfies:

$$\left(\frac{BW_{sync}}{BW_{subcarrier}}+M\right)\cdot N > L > \frac{BW_{sync}}{BW_{subcarrier}}\cdot N.$$

In one embodiment, a maximum value of M is 2.

In one embodiment, the processor is further configured to perform upsampling on the initial synchronization sequence.

According to a fourth aspect, a computer-readable storage medium is provided, and the computer-readable storage medium stores a computer execution instruction. When at least one processor in a synchronization signal sending apparatus performs the computer execution instruction, the synchronization signal sending apparatus performs the synchronization signal sending method according to the first aspect.

According to a fifth aspect, computer program product is provided. The computer program product includes a computer execution instruction, and the computer execution instruction is stored in a computer-readable storage medium. At least one processor of a synchronization signal sending apparatus may read the computer execution instruction from the computer-readable storage medium, and the at least one processor executes the computer execution instruction, so that the synchronization signal sending apparatus performs the synchronization signal sending method according to the first aspect.

According to a sixth aspect, a communications system is provided, including the synchronization signal sending apparatus and the receiving apparatus according to the second aspect, or including the synchronization signal sending apparatus and the receiving apparatus according to the third aspect.

In one embodiment, a spectrum width corresponding to the initial synchronization sequence is greater than the bandwidth of the synchronization channel and is less than a sum of the bandwidth of the synchronization channel and a system protection bandwidth, N is a quantity of time-domain symbols occupied by the synchronization signal, and N is an integer greater than 1.

Embodiments provide the synchronization signal sending method and apparatus. The method includes: obtaining the initial synchronization sequence, where the spectrum width corresponding to the initial synchronization sequence is greater than the bandwidth of the synchronization channel and is less than the sum of the bandwidth of the synchronization channel and the system protection bandwidth; dividing the initial synchronization sequence into the N sub-synchronization sequences; carrying the N sub-synchronization sequences on the N time-domain symbols; and sending the N time-domain symbols to the receiving apparatus. According to the synchronization signal sending method provided in the embodiments, the bandwidth loss of the synchronization signal is reduced, and the utilization and the synchronization performance of the system synchronization bandwidth are improved.

DESCRIPTION OF EMBODIMENTS

Figure 1:
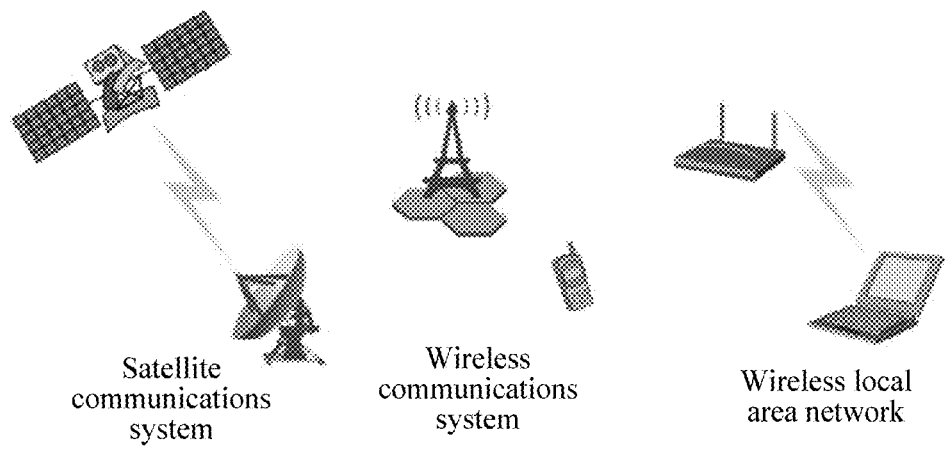
FIG. 1 is a system architectural diagram of a synchronization signal sending method according to an embodiment of the present invention.

FIG. 1 is a system architectural diagram of a synchronization signal sending method according to an embodiment of the invention. The synchronization signal sending method provided in this embodiment may be applied to a communications system whose transmit end and receive end need to be synchronized. As shown in FIG. 1, a typical communications system includes a satellite communications system, a wireless communications system, and a wireless local area network.

The satellite communications system usually includes a satellite end and a terrestrial end. The satellite end is used as a relay station in space, and amplifies an electromagnetic wave that is sent by a terrestrial station, and then returns the amplified electromagnetic wave to another terrestrial station. The terrestrial station is an interface between a satellite and a terrestrial public network.

The wireless communications system usually includes three parts: a sending device, a receiving device, and a radio channel. Different wireless communications systems include different devices. For example, devices that are included in a Long Term Evolution (LTE) communications system include an evolved base station (eNodeB) and a terminal, and devices that are included in an Enterprise Internet of Things (eIoT) communications system include a base station and a terminal.

The wireless local area network (WLAN) is a local area network in which a twisted pair copper wire is replaced with an electromagnetic wave. Devices in the wireless local area network include a wireless router and a terminal.

The terminal provided in this embodiment of the invention may be a wireless terminal such as a mobile phone or a tablet computer. The wireless terminal includes a device providing a voice and/or data service to a user. The terminal may further be a handheld device, an in-vehicle device, a wearable device, and a computing device having a wireless connection function, and various user equipments (UEs), mobile stations (MS), and terminals. This is not limited in this embodiment of the invention.

The base station and the wireless router provided in this embodiment of the invention may be any device having management of wireless network resources. This is not limited in this embodiment of the invention.

The synchronization signal sending method provided in this embodiment of the invention is mainly applied to a scenario in which a synchronization signal is carried in a plurality of symbols in a narrowband communications system, to resolve a technical problem in the prior art that currently a synchronization bandwidth is not fully used and synchronization performance is impaired after redundancy elimination and bandwidth limitation operations are performed on the synchronization signal.

The following describes in detail, by using specific embodiments, technical solutions in this application and how the technical solutions in this application resolve the foregoing technical problem. The following several specific embodiments may be combined with each other, and a same or similar concept or process may not be described repeatedly in some embodiments.

Figure 2:
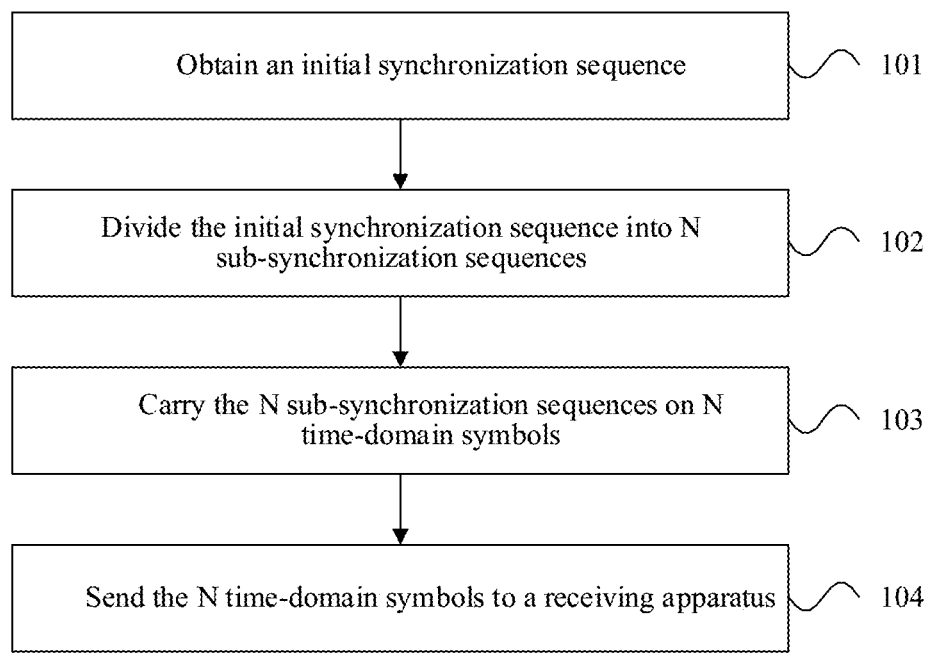
FIG. 2 is a flowchart of a synchronization signal sending method according to an embodiment of the present invention.

FIG. 2 is a flowchart of of a synchronization signal sending method according to an embodiment of the invention. The synchronization signal sending method provided in this embodiment may be performed by a synchronization signal sending apparatus. The synchronization signal sending apparatus varies with different communications systems. For example, the synchronization signal sending apparatus may be an evolved base station, a base station, a micro base station, a wireless router, or a terrestrial station. As shown in FIG. 2, the synchronization signal sending method provided in this embodiment of the invention may include the following operations.

Operation 101. obtain an initial synchronization sequence.

A spectrum width corresponding to the initial synchronization sequence is greater than a bandwidth of a synchronization channel and is less than a sum of the bandwidth of the synchronization channel and a system protection bandwidth;

A specific implementation for obtaining the initial synchronization sequence is not limited in this embodiment of the invention, and existing methods may be used for obtaining initial synchronization sequences for different communications systems. For example, for an LTE communications system or an eIoT communications system, the synchronization signal sending apparatus may select an initial synchronization sequence in a preset synchronization sequence candidate set.

Operation 102. Divide the initial synchronization sequence into N sub-synchronization sequences.

N is a quantity of time-domain symbols occupied by a synchronization signal, and N is an integer greater than 1.

Operation 103. Carry the N sub-synchronization sequences on N time-domain symbols.

Each sub-synchronization sequence is carried in one time-domain symbol.

Operation 104. Send the N time-domain symbols to a receiving apparatus.

In this embodiment of the invention, the spectrum width corresponding to the initial synchronization sequence is greater than the bandwidth of the synchronization channel and is less than the sum of the bandwidth of the synchronization channel and the system protection bandwidth. Based on a system synchronization bandwidth, a margin is reserved for redundancy elimination of the synchronization signal. Compared with the prior art, the initial synchronization sequence provided in this embodiment of the invention fully uses the system synchronization bandwidth and the system protection bandwidth, so that a length of the initial synchronization sequence is increased and a correlation is better. After operations such as redundancy elimination and bandwidth limitation are performed, a bandwidth loss of the synchronization signal can be reduced, and utilization and synchronization performance of the system synchronization bandwidth are improved.

It should be noted that the bandwidth of the synchronization channel and the system protection bandwidth are not specifically limited in this embodiment of the invention, and vary with different communications systems.

It should be noted that a specific implementation for carrying the N sub-synchronization sequences on the N time-domain symbols in step 103 is not limited in this embodiment, and varies with different communications systems, and existing signal processing methods in the different communications systems can be used.

It should be noted that a specific implementation of the synchronization sequence is not limited in this embodiment of the invention, and is set based on a need. For example, the synchronization sequence may be a ZC sequence.

Optionally, before operation 102 of dividing the initial synchronization sequence into N sub-synchronization sequences, the method provided in this embodiment of the invention may further include:

performing upsampling on the initial synchronization sequence.

Optionally, in one embodiment, a length L of the initial synchronization sequence may satisfy:

$$(BW_{sync}+M \cdot BW_{subcarrier}) \cdot T_{sync} > L > BW_{sync} \cdot T_{sync}.$$

$BW_{sync}$ represents the bandwidth of the synchronization channel, $BW_{subcarrier}$ represents a subcarrier bandwidth, $T_{sync}$ represents duration of the synchronization signal, $M=BW_{protect}/BW_{subcarrier}$, and $BW_{protect}$ represents the system protection bandwidth.

Optionally, in another embodiment, a length L of the initial synchronization sequence may satisfy:

$$\left(\frac{BW_{sync}}{BW_{subcarrier}} + M\right) \cdot N > L > \frac{BW_{sync}}{BW_{subcarrier}} \cdot N.$$

Optionally, a maximum value of M may be 2.

The following describes in detail by using a specific communications system as an example.

Figure 3:
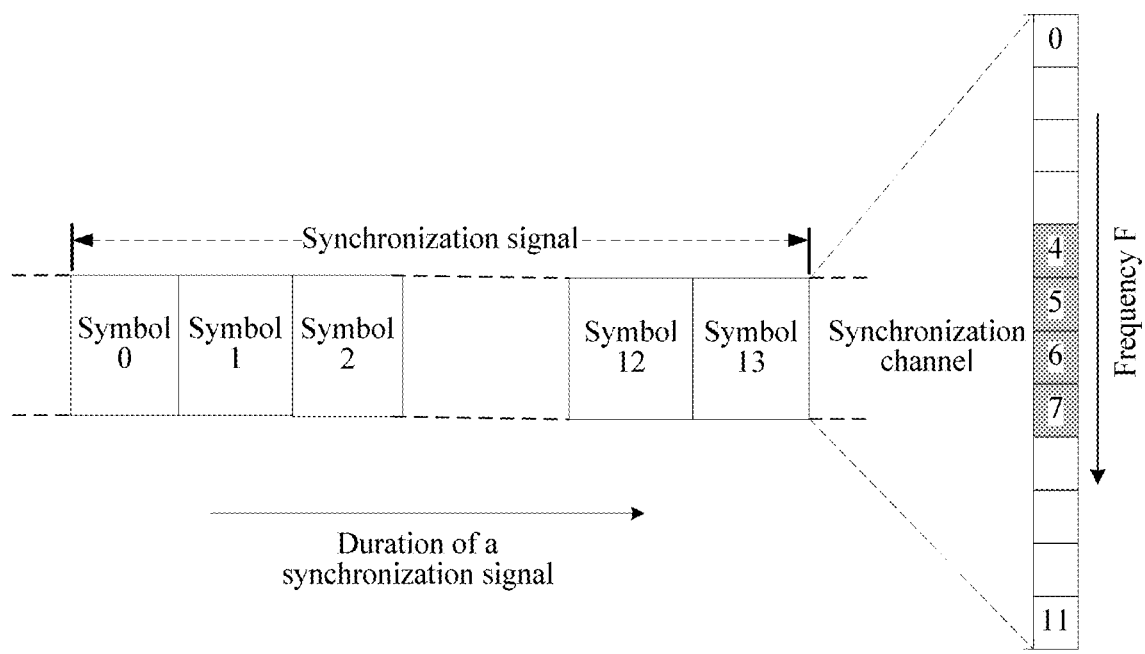
FIG. 3 is a schematic structural diagram of a synchronization signal of an Enterprise Internet of Things (eIoT) system in of a synchronization signal sending method according to an embodiment of the present invention.

It is assumed that the communications system is an eIoT system. FIG. 3 is a schematic structural diagram of a synchronization signal of an eIoT system in a synchronization signal sending method according to an embodiment of the invention. As shown in FIG. 3, a time-domain symbol used by the eIoT system is an OFDM symbol. A total bandwidth of a system channel is 180 kHz, a bandwidth of a synchronization channel is 60 kHz, and a subcarrier bandwidth is 15 kHz. The system includes 12 subcarriers. The system uses four subcarriers in a middle position of the channel to carry synchronization information. A synchronization signal is formed by 14 consecutive OFDM symbols, and the duration of the synchronization signal is 1 millisecond (ms). A system protection bandwidth is 30 kHz.

It can be learned that in the eIoT system, $BW_{sync}$=60 kHz, $BW_{subcarrier}$=15 kHz, $BW_{protect}$=30 kHz, N=14, $T_{sync}$=1 ms, and $M=BW_{protect}/BW_{subcarrier}$=30 kHz/15 kHz=2.

In the eIoT system, after upsampling is performed on an initial synchronization sequence, the initial synchronization sequence is divided into 14 sub-synchronization sequences to be sequentially mapped to 14 OFDM symbols. A Fast Fourier Transform (FFT) is first performed on each sub-synchronization sequence, and then Inverse Fast Fourier Transform (IFFT) is performed. According to a requirement of an OFDM symbol, only information at a frequency point F of the synchronization channel is reserved in the frequency domain, and data at a CP position is eliminated and is replaced with CP data. The base station combines the 14 sub-synchronization sequences on which signal processing has been performed, to form a to-be-sent synchronization signal.

An initial synchronization sequence used by the example eIoT system is a ZC sequence whose length is 59.

According to the synchronization signal sending method provided in this embodiment of this application, in an implementation, the length L of the initial synchronization sequence may satisfy 90>L>60. In another embodiments, the length L of the initial synchronization sequence may satisfy 84>L>56.

It is assumed that the first embodiment in which the initial synchronization sequence is a ZC sequence whose length is 79 is used in this embodiment of the invention.

Figure 4:
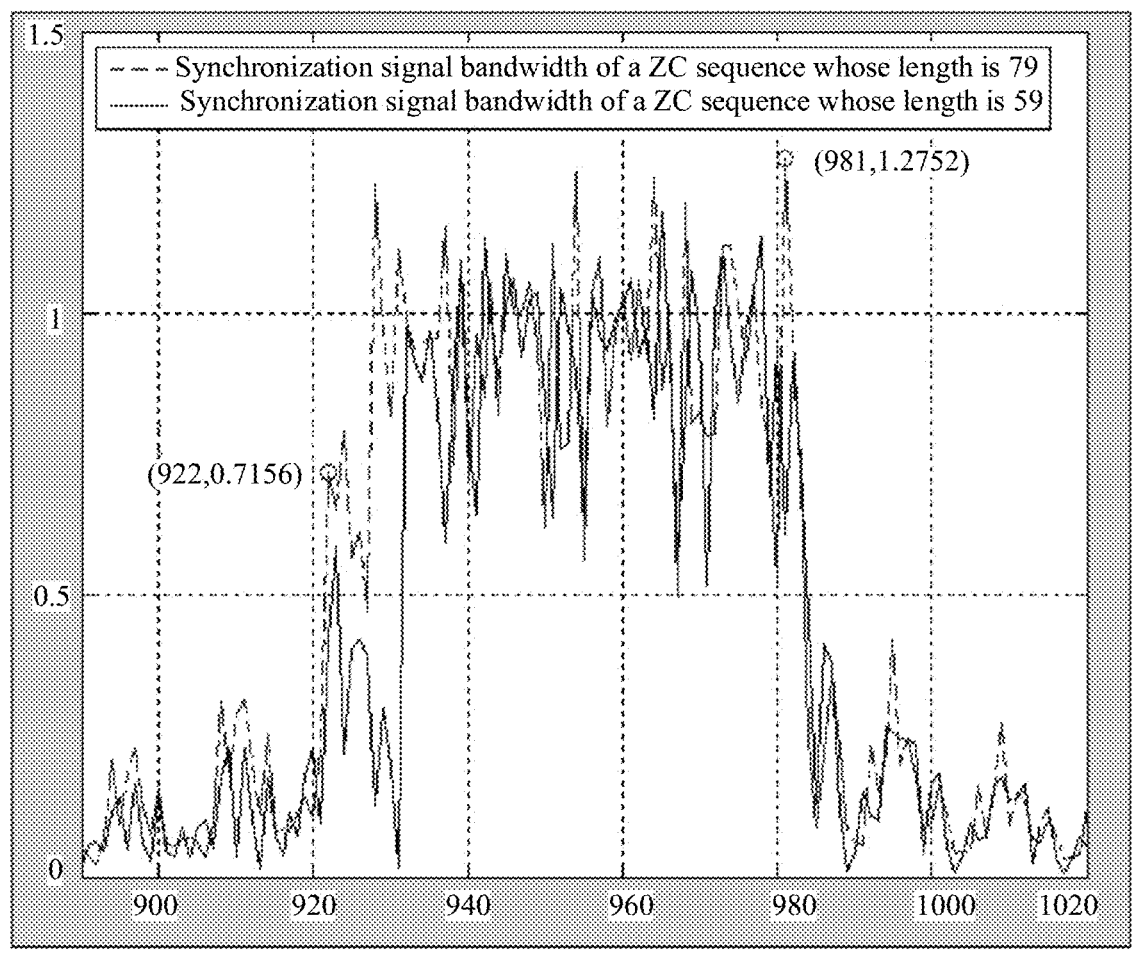
FIG. 4 is an alignment diagram of spectrum widths corresponding to synchronization sequences of different lengths in a synchronization signal sending method according to an embodiment of the present invention.
Figure 5:
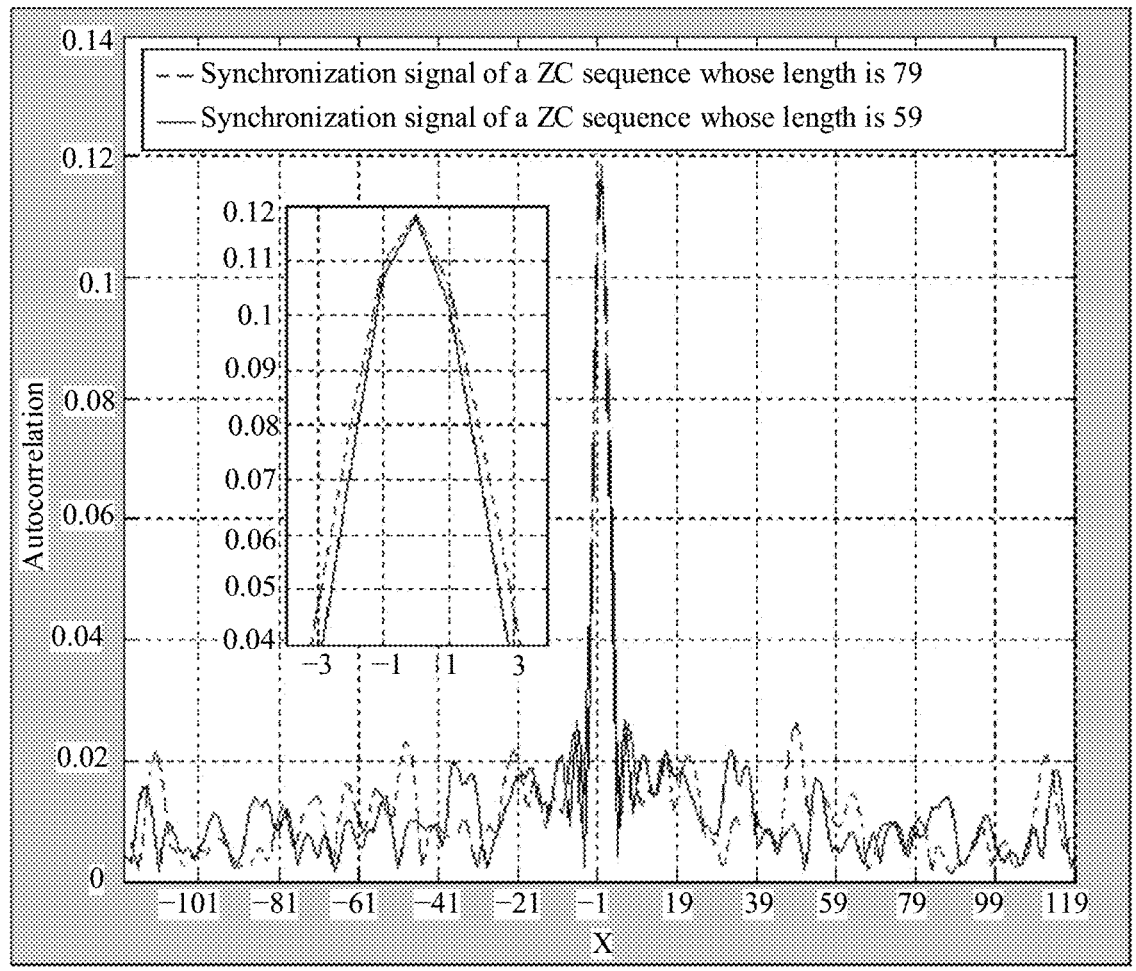
FIG. 5 is an alignment diagram of related performance of synchronization sequences of different lengths in a synchronization signal sending method according to an embodiment of the present invention.

FIG. 4 is an alignment diagram of spectrum widths corresponding to synchronization sequences of different lengths in a synchronization signal sending method according to an embodiment of the invention. FIG. 5 is an alignment diagram of related performance of synchronization sequences of different lengths in a synchronization signal sending method according to an embodiment of the invention.

As shown in FIG. 4 and FIG. 5, the ZC sequence whose length is 59 is used in the prior art, and a synchronization bandwidth that corresponds to a generated synchronization signal is 51 kHz. Consequently, a bandwidth of 60 kHz of the synchronization channel provided by a system is not fully used. However, the ZC sequence whose length is 79 is used in this embodiment of this application, and a synchronization bandwidth that corresponds to a generated synchronization signal approximates 60 kHz (981 kHz−922 kHz=59 kHz), thereby improving utilization of the system synchronization bandwidth. In addition, according to FIG. 5, the ZC sequence whose length is 79 has better autocorrelation performance than the ZC sequence whose length is 59, thereby improving synchronization performance of the system.

This embodiment of of the invention provides a synchronization signal sending method, including: obtaining the initial synchronization sequence; dividing the initial synchronization sequence into the N sub-synchronization sequences; carrying the N sub-synchronization sequences on the N time-domain symbols; and sending the N time-domain symbols to the receiving apparatus. According to the synchronization signal sending method provided in this embodiment of the invention, the system synchronization bandwidth and the system protection bandwidth are fully used, so that the length of the initial synchronization sequence is increased and a correlation is better. After operations such as redundancy elimination and bandwidth limitation are performed, a bandwidth loss of the synchronization signal can be reduced, and utilization and synchronization performance of the system synchronization bandwidth are improved.

Figure 6:
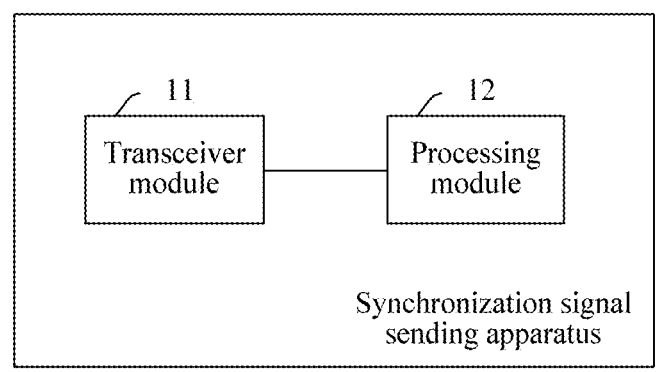
FIG. 6 is a schematic structural diagram of a synchronization signal sending apparatus according to an embodiment of the present invention.

FIG. 6 is a schematic structural diagram of a synchronization signal sending apparatus according to an embodiment of the invention. The synchronization signal sending apparatus provided in this embodiment of the invention varies with different communications systems. For example, the synchronization signal sending apparatus may be an evolved base station, a base station, a micro base station, a wireless router, or a terrestrial station, and can perform the synchronization signal sending method provided in the embodiments shown in FIG. 2 to FIG. 5. As shown in FIG. 6, the synchronization signal sending apparatus provided in this embodiment of the invention may include a processing module 12 and a transceiver module 11.

The processing module 12 is configured to: obtain an initial synchronization sequence, where a spectrum width corresponding to the initial synchronization sequence is greater than a bandwidth of a synchronization channel and is less than a sum of the bandwidth of the synchronization channel and a system protection bandwidth; divide the initial synchronization sequence into N sub-synchronization sequences, where N is a quantity of time-domain symbols occupied by a synchronization signal, and N is an integer greater than 1; and carry the N sub-synchronization sequences on the N time-domain symbols, where each sub-synchronization sequence is carried in one time-domain symbol.

The transceiver module 11 is configured to send the N time-domain symbols to a receiving apparatus.

Optionally, a length L of the initial synchronization sequence satisfies:

$$(BW_{sync}+M \cdot BW_{subcarrier}) \cdot T_{sync} > L > BW_{sync} \cdot T_{sync}.$$

BW$_{sync}$ represents the bandwidth of the synchronization channel, BW$_{subcarrier}$ represents a subcarrier bandwidth, T$_{sync}$ represents duration of the synchronization signal, M=BW$_{protect}$/BW$_{subcarrier}$, and BW$_{protect}$ represents the system protection bandwidth.

Optionally, a length L of the initial synchronization sequence satisfies:

$$\left(\frac{BW_{sync}}{BW_{subcarrier}} + M\right) \cdot N > L > \frac{BW_{sync}}{BW_{subcarrier}} \cdot N.$$

Optionally, a maximum value of M is 2.

Optionally, the processing module 12 is further configured to perform upsampling on the initial synchronization sequence before dividing the initial synchronization sequence into the N sub-synchronization sequences.

The synchronization signal sending apparatus provided in this embodiment of the invention is configured to perform the synchronization signal sending method provided in the method embodiments shown in FIG. 2 to FIG. 5, their technical principles and the technical effects are similar, and details are not described herein again.

Figure 7:
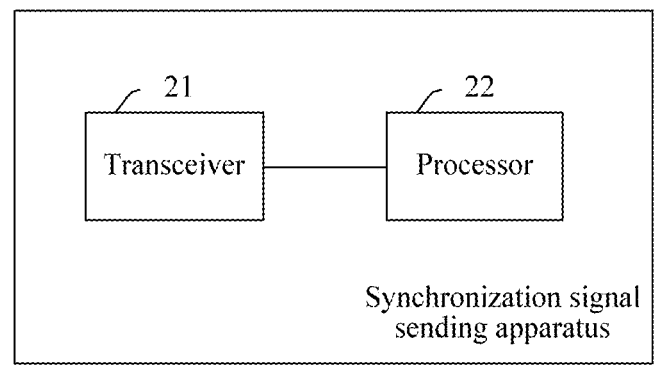
FIG. 7 is a schematic structural diagram of a synchronization signal sending apparatus according to an embodiment of the present invention.

FIG. 7 is a schematic structural diagram of a synchronization signal sending apparatus according to an embodiment of the invention. The synchronization signal sending apparatus provided in this embodiment of the invention varies with different communications systems. For example, the synchronization signal sending apparatus may be an evolved base station, a base station, a micro base station, a wireless router, or a terrestrial station, and can perform the synchronization signal sending method provided in the embodiments shown in FIG. 2 to FIG. 5. As shown in FIG. 7, the synchronization signal sending apparatus provided in this embodiment of the invention may include a processor 22 and a transceiver 21.

The processor 22 is configured to: obtain an initial synchronization sequence, where a spectrum width corresponding to the initial synchronization sequence is greater than a bandwidth of a synchronization channel and is less than a sum of the bandwidth of the synchronization channel and a system protection bandwidth; divide the initial synchronization sequence into N sub-synchronization sequences, where N is a quantity of time-domain symbols occupied by a synchronization signal, and N is an integer greater than 1; and carry the N sub-synchronization sequences on the N time-domain symbols, where each sub-synchronization sequence is carried in one time-domain symbol.

The transceiver 21 is configured to send the N time-domain symbols to a receiving apparatus.

Optionally, a length L of the initial synchronization sequence satisfies:

$$(BW_{sync} + M \cdot BW_{subcarrier}) \cdot T_{sync} > L > BW_{sync} \cdot T_{sync}.$$

BW$_{sync}$ represents the bandwidth of the synchronization channel, BW$_{subcarrier}$ represents a subcarrier bandwidth, T$_{sync}$ represents duration of the synchronization signal, M=BW$_{protect}$/BW$_{subcarrier}$, and BW$_{protect}$ represents the system protection bandwidth.

Optionally, a length L of the initial synchronization sequence satisfies:

$$\left(\frac{BW_{sync}}{BW_{subcarrier}} + M\right) \cdot N > L > \frac{BW_{sync}}{BW_{subcarrier}} \cdot N.$$

Optionally, a maximum value of M is 2.

Optionally, the processor 22 is further configured to perform upsampling on the initial synchronization sequence before dividing the initial synchronization sequence into the N sub-synchronization sequences.

The synchronization signal sending apparatus provided in this embodiment is configured to perform the synchronization signal sending method provided in the method embodiments shown in FIG. 2 to FIG. 5, their technical principles and the technical effects are similar, and details are not described herein again.

Another embodiment of the invention provides a computer-readable storage medium. The computer-readable storage medium stores a computer execution instruction. When at least one processor of a synchronization signal sending apparatus executes the computer execution instruction, the synchronization signal sending apparatus performs the synchronization signal sending method provided in the method embodiments shown in FIG. 2 to FIG. 5.

Another embodiment of the invention provides a computer program product. The computer program product includes a computer execution instruction, and the computer execution instruction is stored in a computer-readable storage medium. At least one processor of a synchronization signal sending apparatus may read the computer execution instruction from the computer-readable storage medium, and the at least one processor executes the computer execution instruction, so that the synchronization signal sending apparatus performs the synchronization signal sending method provided in the method embodiments shown in FIG. 2 to FIG. 5.

Figure 8:
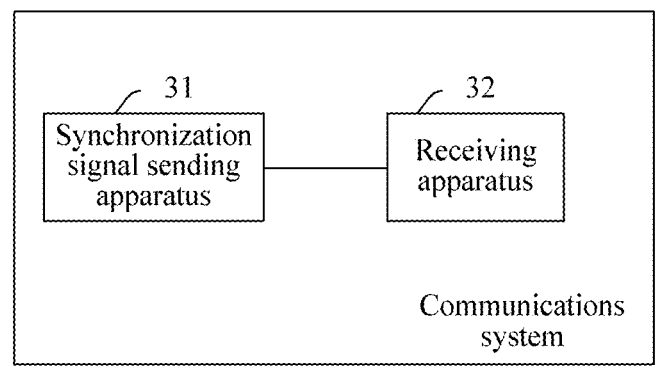
FIG. 8 is a schematic structural diagram of a communications system according to an embodiment of the present invention.

FIG. 8 is a schematic structural diagram of a communications system according to an embodiment of the invention. As shown in FIG. 8, the communications system provided in this embodiment of the invention may include the synchronization signal sending apparatus 31 provided in the embodiment shown in FIG. 6 and a receiving apparatus 32, or the synchronization signal sending apparatus 31 provided in the embodiment shown in FIG. 7 and a receiving apparatus 32.

The synchronization signal sending apparatus 31 and the receiving apparatus 32 vary with different communications systems. For example, the synchronization signal sending apparatus 31 may be an evolved base station, a base station, a micro base station, a wireless router, or a terrestrial station. Correspondingly, the receiving apparatus 32 may be a terminal, a satellite end, or the like.

The synchronization signal sending apparatus in the communications systems provided in this embodiment is configured to perform the synchronization signal sending method provided in the method embodiments shown in FIG. 2 to FIG. 5, their technical principles and the technical effects are similar, and details are not described herein again.

What is claimed is:

1. A method for sending a synchronization signal, comprising:
    obtaining an initial synchronization sequence, wherein a spectrum width corresponding to the initial synchronization sequence is greater than a bandwidth of a synchronization channel and is less than a sum of the bandwidth of the synchronization channel and a system protection bandwidth;
    dividing the initial synchronization sequence into N sub-synchronization sequences, wherein N is a quantity of time-domain symbols occupied by a synchronization signal, and N is an integer greater than 1;

carrying the N sub-synchronization sequences on the N time-domain symbols, wherein each of the sub-synchronization sequences is carried in one of the time-domain symbols; and sending the N time-domain symbols to a receiving apparatus.

2. The method according to claim 1, wherein a length L of the initial synchronization sequence satisfies: $(BW_{sync}+M\cdot BW_{subcarrier})\cdot T_{sync} > L > BW_{sync}\cdot T_{sync}$, wherein $BW_{sync}$ represents the bandwidth of the synchronization channel, $BW_{subcarrier}$ represents a subcarrier bandwidth, $T_{sync}$ represents duration of the synchronization signal, $M=BW_{protect}/BW_{subcarrier}$, and $BW_{protect}$ represents the system protection bandwidth.

3. The method according to claim 1, wherein a length L of the initial synchronization sequence satisfies:

$$\left(\frac{BW_{sync}}{BW_{subcarrier}} + M\right) \cdot N > L > \frac{BW_{sync}}{BW_{subcarrier}} \cdot N,$$

wherein $BW_{sync}$ represents the bandwidth of the synchronization channel, $BW_{subcarrier}$ represents a subcarrier bandwidth, $M=BW_{protect}/BW_{subcarrier}$, and $BW_{protect}$ represents the system protection bandwidth.

4. The method according to claim 2, wherein a maximum value of M is 2.

5. The method according to claim 1, wherein before dividing the initial synchronization sequence into the N sub-synchronization sequences, the method further comprises:

performing upsampling on the initial synchronization sequence.

6. An apparatus fpr sending a synchronization signal comprising:

a processor configured to: obtain an initial synchronization sequence, wherein a spectrum width corresponding to the initial synchronization sequence is greater than a bandwidth of a synchronization channel and is less than a sum of the bandwidth of the synchronization channel and a system protection bandwidth; divide the initial synchronization sequence into N sub-synchronization sequences, wherein N is a quantity of time-domain symbols occupied by a synchronization signal, and N is an integer greater than 1; and carry the N sub-synchronization sequences on the N time-domain symbols, wherein each of the sub-synchronization sequences is carried in one of the time-domain symbols; and a transmitter configured to send the N time-domain symbols to a receiving apparatus.

7. The apparatus according to claim 6, wherein a length L of the initial synchronization sequence satisfies: $(BW_{sync}+M\cdot BW_{subcarrier})\cdot T_{sync} > L > BW_{sync}\cdot T_{sync}$, wherein $BW_{sync}$ represents the bandwidth of the synchronization channel, $BW_{subcarrier}$ represents a subcarrier bandwidth, $T_{sync}$ represents duration of the synchronization signal, $M=BW_{protect}/BW_{subcarrier}$, and $BW_{protect}$ and represents the system protection bandwidth.

8. The apparatus according to claim 6, wherein a length L of the initial synchronization sequence satisfies:

$$\left(\frac{BW_{sync}}{BW_{subcarrier}} + M\right) \cdot N > L > \frac{BW_{sync}}{BW_{subcarrier}} \cdot N,$$

wherein $BW_{sync}$ represents the bandwidth of the synchronization channel, $BW_{subcarrier}$ represents a subcarrier bandwidth, $M=BW_{protect}/BW_{subcarrier}$, and $BW_{protect}$ represents the system protection bandwidth.

9. The apparatus according to claim 7, wherein a maximum value of M is 2.

10. The apparatus according to claim 6, wherein the processor is further configured to:

perform upsampling on the initial synchronization sequence.

11. An apparatus for sending a synchronization signal, comprising:

at least one processor, the processor to read instructions from a non-transitory computer-readable medium that, when executed by the processor, configure the apparatus to:

obtain an initial synchronization sequence, wherein a spectrum width corresponding to the initial synchronization sequence is greater than a bandwidth of a synchronization channel and is less than a sum of the bandwidth of the synchronization channel and a system protection bandwidth;

divide the initial synchronization sequence into N sub-synchronization sequences, wherein N is a quantity of time-domain symbols occupied by a synchronization signal, and N is an integer greater than 1;

carry the N sub-synchronization sequences on the N time-domain symbols, wherein each of the sub-synchronization sequences is carried in one of the time-domain symbols; and send the N time-domain symbols to a receiving apparatus.

12. The apparatus according to claim 11, wherein a length L of the initial synchronization sequence satisfies: $(BW_{sync}+M\cdot BW_{subcarrier})\cdot T_{sync} > L > BW_{sync}\cdot T_{sync}$, wherein $BW_{sync}$ represents the bandwidth of the synchronization channel, $BW_{subcarrier}$ represents a subcarrier bandwidth, $T_{sync}$ represents duration of the synchronization signal, $M=BW_{protect}/BW_{subcarrier}$, and $BW_{protect}$ represents the system protection bandwidth.

13. The apparatus according to claim 11, wherein a length L of the initial synchronization sequence satisfies:

$$\left(\frac{BW_{sync}}{BW_{subcarrier}} + M\right) \cdot N > L > \frac{BW_{sync}}{BW_{subcarrier}} \cdot N,$$

wherein $BW_{sync}$ represents the bandwidth of the synchronization channel, $BW_{subcarrier}$ represents a subcarrier bandwidth, $M=BW_{protect}/BW_{subcarrie}$, and $BW_{protect}$ represents the system protection bandwidth.

14. The apparatus according to claim 12, wherein a maximum value of M is 2.

15. The apparatus according to claim 11, wherein the apparatus is further configured to:

perform upsampling on the initial synchronization sequence.

* * * * *